Figure 1:
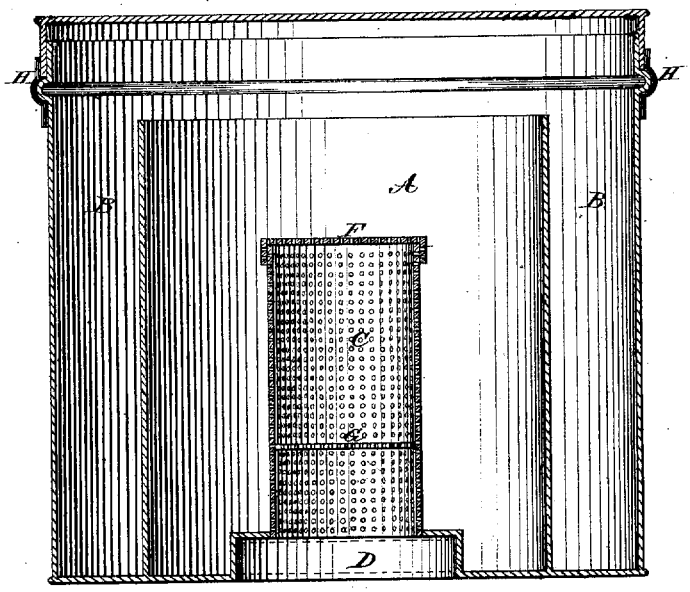

J. W. AIKIN & J. H. STONE.

Fur Set Boxes.

No. 5,430. Reissued June 3, 1873.

*Witnesses:*

T. C. Brecht.

E. F. Hodges.

*Inventors:*

James W. Aikin

John H. Stone

AM. PHOTO-LITHOGRAPHIC CO. N.Y. (OSBORNE'S PROCESS.)

UNITED STATES PATENT OFFICE.

JAMES W. AIKIN, OF PHILADELPHIA, PENNSYLVANIA, AND JOHN H. STONE, OF HAMILTON, CANADA, ASSIGNORS, BY MESNE ASSIGNMENTS, TO FREDERICK CRANE, OF BLOOMFIELD, NEW JERSEY.

IMPROVEMENT IN FUR-SET BOXES.

Specification forming part of Letters Patent No. 70,676, dated November 12, 1867; reissue No. 5,430, dated June 3, 1873; application filed May 27, 1873.

*To all whom it may concern:*

Be it known that we, JAMES W. AIKIN, of Philadelphia, Pennsylvania, and JOHN H. STONE, of Hamilton, Canada, have invented certain new and useful Improvements in Fur-Set Boxes; and that the following is a full, clear, and exact description of the same.

The said improvement consists, first, in a circular muff-case with a receptacle exterior to said case, in which exterior receptacle may be placed the cape, collar, or other article or articles which usually accompany a muff, without injury to said muff by abrasion or pressure. The muff-space, in order to keep the muff stationary and in one position as much as possible, and thereby retain its smooth and unruffled appearance, should be circular, or nearly so. The other or exterior receptacle may vary in its form, as it is intended to contain an article of fur not always of the same shape or dimension; but such article can usually be so folded as to suit most forms of said exterior receptacle. Second, in combining, with said two elements above mentioned, a perforated cylinder placed within the muff-space and concentric with the wall thereof. In this perforated cylinder may be placed gum camphor, or any other desirable moth-preventive substance, in order to more effectually protect the fur-set box from invasion by moths, when said box containing furs is placed away during the summer months. Third, in combining with said last-mentioned elements an air-tight cover.

In the drawing accompanying this specification is shown one form in which my improvements may be carried out.

A is the wall of the circular muff-space. B is the wall of the exterior receptacle, designed to retain, without injury to the muff, a cape, collar, or other article of fur, and is here shown circular. C is a perforated cylinder, which may, if desired, be placed within the muff-space, and concentric with the wall of said muff-space, so as not to interfere with the inserted muff. The lower end of this perforated cylinder may be constructed with a circular recess, D, in the bottom of the fur-set box, which recess can be closed up by a cork, or in any other convenient manner, so as to be air-tight. After the moth-preventive substance is inserted at the top through an opening, over which is placed a cover, F, such substance is retained on the diaphragm G, and the air, passing up from the bottom through the diaphragm, will carry the camphor fumes into the fur-set box. To facilitate the passage of air up into and through this perforated cylinder containing the camphor, the fur-set box should be laid on its side, with the cork at the bottom removed. Over the joint formed by the cover and the outside of the wall B may be sprung an elastic rubber band, H, in order to render the box perfectly air-tight at the top.

What I claim is—

1. A fur-set box in which is combined a circular muff-case and exterior thereto a receptacle for retaining the cape, collar, or other article of fur, substantially as described.

2. A fur-set box in which is combined a circular muff-case, having an interior perforated central cylinder for holding camphor or other moth-preventive substance, and a receptacle exterior to the muff-case for retaining the cape, collar, or other accompanying article of fur, substantially as described.

3. A fur-set box in which is combined a circular muff-case, having an interior perforated central cylinder for holding camphor or other moth-preventive substance, a receptacle exterior to the muff-case for retaining the cape, collar, or other accompanying article of fur, and an elastic rubber ring applied at the cover, as set forth.

JAMES W. AIKIN.
J. H. STONE.

Witnesses as to JAMES W. AIKIN:
A. F. DONEGAN,
JASON CRANE.

Witnesses as to J. H. STONE:
W. BRUCE,
P. L. SCRIVEN.